United States Patent [19]

Takai et al.

[11] Patent Number: 4,636,063
[45] Date of Patent: Jan. 13, 1987

[54] AUTOMATIC EXPOSURE ADJUSTING DEVICE

[75] Inventors: Yasuhiro Takai, Sakurai; Kenichi Morimoto, Nara; Shigekazu Yoshida, Nara; Takao Tagawa, Kashihara, all of Japan

[73] Assignee: Sharp Kabushiki Kaisha, Osaka, Japan

[21] Appl. No.: 734,097

[22] Filed: May 15, 1985

[30] Foreign Application Priority Data
  May 21, 1984 [JP] Japan .................................. 59-103192

[51] Int. Cl.⁴ ....................... G03B 27/74; G03B 27/80
[52] U.S. Cl. ....................................... 355/68; 355/14 E
[58] Field of Search ........................... 355/68, 57, 14 E

[56] References Cited

U.S. PATENT DOCUMENTS
  4,544,258  10/1985  Takano .................................. 355/68

FOREIGN PATENT DOCUMENTS
  158662  9/1983  Japan .................................. 355/14 E Primary Examiner—Richard A. Wintercorn
Attorney, Agent, or Firm—Birch, Stewart, Kolasch & Birch

[57] ABSTRACT

An automatic exposure adjusting device for use in a variable copying magnification type copying apparatus, which controls quantity of light of a light source by detecting photographic density of an original document by the use of a photo detector and includes a shielding plate formed with a slit aligned with an optical path for subjecting a photosensitive member to exposure. The photo detector is provided below and adjacent to the light source, while the shielding plate is provided below and adjacent to a copy face of the original document.

7 Claims, 15 Drawing Figures

AUTOMATIC EXPOSURE ADJUSTING DEVICE

BACKGROUND OF THE INVENTION

The present invention generally relates to copying apparatus and more particularly, to an automatic exposure adjusting device for use in a variable copying magnification type copying apparatus enabling change of its copying magnification.

Conventionally, in copying apparatus, it has been so arranged that the exposure amount is roughly adjusted visually by an operator by means of an exposure amount adjustment dial provided on an operating panel. Therefore, copies obtained from a single original document by different operators have different degrees of copying brightness. Furthermore, since further adjustments are required in the case where the copying apparatus are provided with an automatic document feeder for automatically feeding original documents continuously, such a problem frequently arises that a plurality of improper copies are produced before one proper copy is obtained.

Recently, in order to obviate the above described drawback of the known copying apparatus, there have been proposed copying apparatus provided with a density detection means for detecting photographic density of original documents or further with an auutomatic exposure adjusting means for automatically adjusting exposure amount in accordance with the detected photographic density of the original documents obtained by the density detection means. However, in this prior art density detection means, since one or a plurality of photo detectors arranged in parallel with each other are provided in an optical path of an optical system for forming images on a photosensitive member, the optical path is partially intercepted by the photo detector or the photo detectors. Therefore, the prior art density detection means has such disadvantages that unsatisfactory images are formed on the photosensitive member and an excessive load is applied to control members such as a light source, etc. Furthermore, prior art density detection means is so inconvenient that, in order to process a detection value of the photo detector, an arithmetic circuit corresponding to an averaged light measuring method or a selective light measuring method, etc. is required to be provided.

Furthermore, conventionally, in the case of automatic exposure adjustments in variable copying magnification type copying apparatus the relationship between the detection value of the photo detector and the exposure amount of the photosensitive member from an identical original document undergoes change upon change of the copying magnification. Thus, when the copying magnification is changed, it is necessary to mechanically displace the photo detector to a position corresponding to the changed copying magnification or to process the detection value of the photo detector into a value corresponding to the changed copying magnification by using a complicated arithmetic circuit so as to control quantity of light of the light source on the basis of the value. Thus, the known exposure adjusting devices are disadvantageous in that the configuration of the arithmetic circuit becomes sophisticated, thereby making the maintenance troublesome. Moreover, the known exposure adjusting devices have such a drawback that since change of the relation between the detection value of the photo detector and the exposure amount of the photosensitive member upon change of the copying magnification is not uniform, it is extremely difficult to perform the arithmetic operation accurately.

In addition, prior art copying apparatus have such inconveniences that since special measures against abrupt changes of ambient conditions such as temperature, humidity, etc. or deterioration of the photosensitive member, developer, etc. are not taken, it is impossible to obtain proper copies at the time of occurrence of such changes, thus resulting in defective copies having obscure images, images of insufficient gradation at the shadow portion, or photographic fog in the background.

SUMMARY OF THE INVENTION

Accordingly, an essential object of the present invention is to provide an improved automatic exposure adjusting device for use in a variable copying magnification type copying apparatus, requiring no complicated arithmetic operation by using an optical mechanism in which relation between a detection value of a photo detector and exposure amount of a photosensitive member does not change upon change of the copying magnification, with substantial elimination of the disadvantages inherent in conventional automatic exposure adjusting devices of this kind.

In order to accomplish this object of the present invention, there is provided an automatic exposure adjusting device for use in a variable copying magnification type copying apparatus enabling continuous change of its copying magnification, which controls quantity of light of a light source of said copying apparatus on a real time basis by detecting photographic density of a scanned portion of a copy face of an original document by the use of a photo detector during the copying operation of said original document. According to the present invention the photo detector is provided below and adjacent to the light source; and a shielding plate which is provided below and adjacent to said copy face of said original document is formed with a slit such that said slit is brought into alignment with an optical path for subjecting a photosensitive member of said coyping apparatus to exposure.

BRIEF DESCRIPTION OF THE DRAWINGS

This object and feature of the present invention will become apparent from the following description taken in conjunction with the preferred embodiment thereof with reference to the accompanying drawings, wherein:

FIG. 2b is a graph indicative of quantity of light passed through an opening of the shielding plate of FIG. 2a;

FIGS. 3a and 3b to FIGS. 7a and 7b are views similar to FIGS. 2a and 2b, respectively, particularly showing modifications thereof;

DETAILED DESCRIPTION OF THE INVENTION

Figure 1:
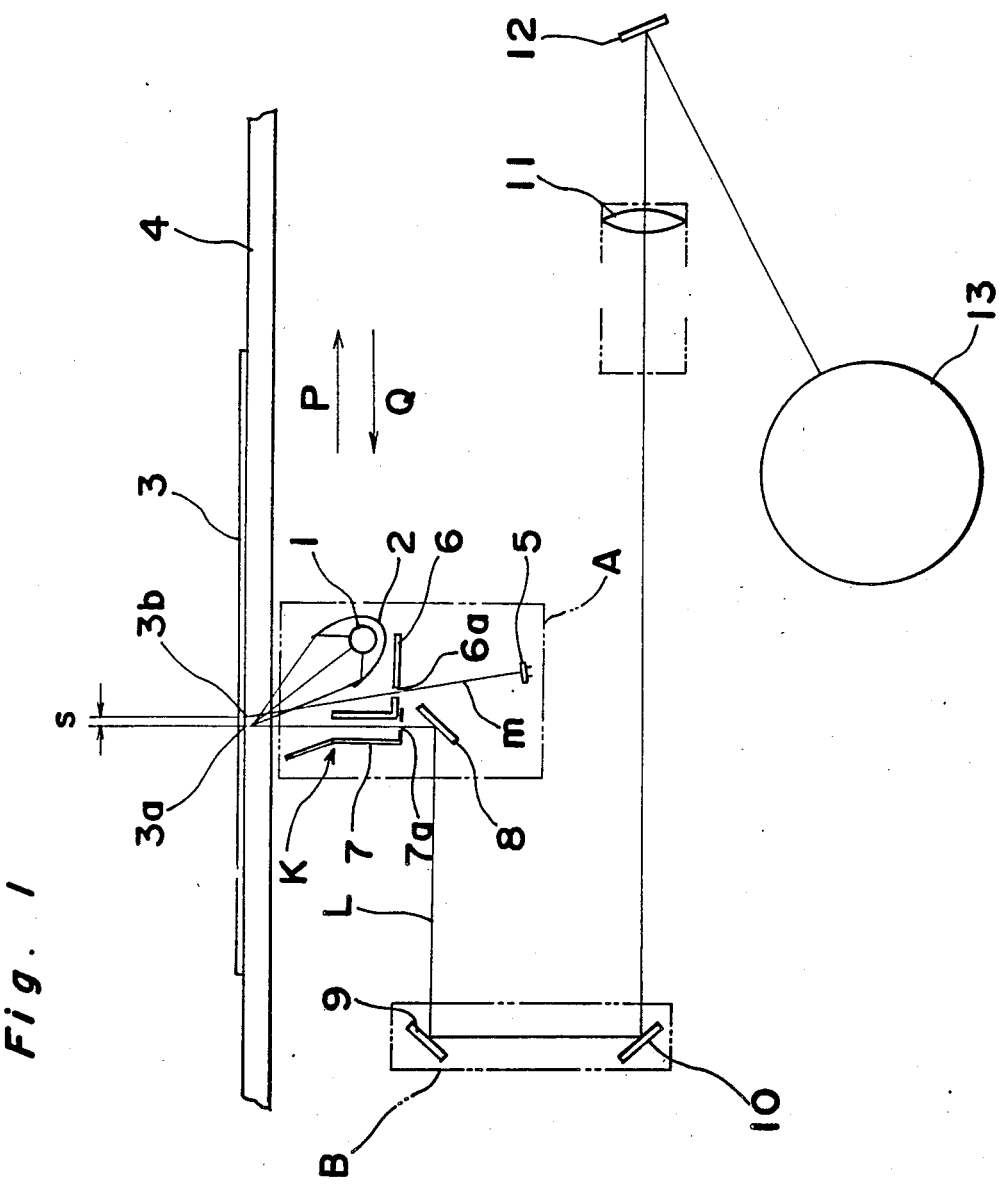
FIG. 1 is a fragmentary schematic view of a variable copying magnification type copying apparatus provided with an automatic exposure adjusting device according to the present invention.

Before the description of the present invention proceeds, it is to be noted that like parts are designated by like reference numerals throughout several views of the accompanying drawings.

Referring now to the drawings, there is shown in FIG. 1, a main portion of a variable copying magnification type copying apparatus provided with an automatic exposure adjusting device K according to one preferred embodiment of the present invention. The copying apparatus includes a light source 1, a reflector 2, an original platform 4, reflecting mirrors 8, 9, 10 and 12, a copying lens 11 disposed between the reflecting mirrors 10 and 12 and a photosensitive drum 13. An original document 3 is placed on the original platform 4 such that a copy face of the original document 3 confronts the light source 1. Light irradiated from the light source 1 is mainly converged at a linear portion 3a of the original document 3, with the linear portion 3a extending horizontally at right angles to a scanning direction P of the original document 3. A light ray L reflected at the linear portion 3a and having data of an image of the original document 3 is directed, through the reflecting mirrors 8, 9 and 10, to the copying lens 11 for making focusing adustments of the light ray L and then, is led, via the reflecting mirror 12, to the photosensitive drum 13 so as to subject the photosensitive drum 13 to exposure such that the image of the original document 3 is formed on the photosensitive drum 13.

The automatic exposure adjusting device K includes a photo detector 5 for detecting photographic density of the image of the original document 3, a first shielding plate 6 of an L-shaped cross section formed with an opening 6a, and a second shielding plate 7 of a substantially L-shaped cross section formed with a slit 7a having a clearance of 5 to 10 mm. The second shielding plate 7 is disposed between the linear portion 3a and the reflecting mirror 8 such that the light ray L passes through the slit 7a. The photo detector 5 is provided below the reflector 2. The first shielding plate 6 is provided between the reflector 2 and the photo detector 5. Light from the light source 1 is also reflected at a linear portion 3b of the original document 3 and then, is received by the photo detector 5 through the opening 6a of the first shielding plate 6. The linear portion 3b is disposed forwardly of the linear portion 3a in the scanning direction P of the original document 3 and is spaced with a gap s from the linear portion 3a. It is to be noted that the gap s is set at a distance covered by a scanning member of the copying apparatus in a time period during which a control circuit (FIG. 8) for the automatic exposure adjusting device K effects feedback control of the light source 1 through processing of a detected value of the photo detector 5.

In the above described arrangement of the copying apparatus, a movable unit A constituted by the light source 1, reflector 2, photo detector 5, first and second shielding plates 6 and 7 and reflecting mirror 8 is moved in the scanning direction P so as to scan the original document 3, while an actuator unit B constituted by the reflecting mirrors 9 and 10 is moved in the scanning direction P at one-half the travelling speed of the movable unit A. Meanwhile, the photosensitive drum 13 is rotated at a circumferential speed corresponding to the travelling speed of the movable unit A such that a latent image is formed on the photosensitive drum 13.

When the copying magnification of the copying apparatus is varied manually, the focal length of the copying lens 11 changes and thus, the size of the latent image formed on the photosensitive drum 13 changes. When a copying operation is performed in the copying apparatus at this time, amount of the exposure for forming the latent image on the photosensitive drum 13 changes in response to change of the copying magnification. Supposing that character n represents a ratio of an exposure amount at an arbitrary copying magnification M having a negative sign to an exposure amount at an equal size copying magnification, i.e., M=−1 by setting the slit 7a at 5 to 10 mm, it is known that the ratio n is expressed by the following equation:

$$n = -4M/(1-M)^2$$

Provided that the copying magnification M is −0.647, the ratio n assumes a value of about 0.95, namely the exposure amount at the copying magnification M of −0.647 decreases by about 5% as compared with that at the equal size copying magnification of −1. Since the copying magnification M is usually set at −0.707 approximately in actual use, the ratio n assumes a value of about 0.97, so that it becomes practically possible to neglect change of the exposure amount. Furthermore, since the photo detector 5 is disposed below the light source 1, the photo detector 5 measures quantity of light reflected from the original document 3 under an identical condition regardless of change of the copying magnification M. Consequently, it becomes possible to control quantity of light of the light source 1 on the basis of the detection value of the photo detector 5 even at the time of change of the copying magnification M without the need for performing complicated arithmetic operations.

As is clear from the foregoing description, in the present invention, the photo detector is disposed below and adjacent to the light source and the slit for passing therethrough light reflected from the original document along the optical path leading to the photosensitive member is provided.

Accordingly, in accordance with the present invention, since the exposure amount of the photosensitive member becomes substantially constant even if the copying magnification is changed, it becomes possible to control quantity of light of the light source even at the time of change of the copying magnification without the need for performing complicated arithmetic operations of the detection value of the photo detector.

Hereinbelow, arrangements of the automatic exposure adjusting device K will be described in more detail with reference to FIGS. 2 to 9. Initially, the position of the photo detector 5 in the automatic exposure adjusting device K is described with reference to FIG. 9. In this embodiment of the present invention, the photo detector 5 is provided in an area a (encircled by broken lines) adjacent to the original document setting position of the original platform 4. This is because the area a does not intercept the optical path leading to the photosensitive drum 13, the information of the original document 3 is rapidly transmitted to the photo detector 5 and the exposure amount of the photosensitive drum 13 can be controlled automatically without the need for performing additional electrical or mechanical control of change of the copying magnification.

It may be conaisered that the photo detector 5 can be provided in an area b (encircled by broken lines) adjacent to the photosensitive drum 13, an area c (encircled by broken lines) adjacent to the copying lens 11 or an area d (encircled by broken lines) adjacent to the reflecting mirror 12. However, in the case where the photo detector 5 is provided in the area b, the optical path leading to the photosensitive drum 13 is partially intercepted by the photo detector 5, it is difficult to obtain simultaneous or preceding information from the original document 3 and it becomes difficult to synchronize actuation of the photo detector 5 with the copying operation especially at higher copying speeds. Meanwhile, in the case where the photo detector 5 is provided in the area c or the area d, the same problem as in the area b arises and further, such a phenomenon takes place that the detection value of the photo detector 5 changes in response to change of the copying magnification under an identical quantity of light of the light source 1. In order to obviate such a phenomenon, there are two methods. One method is to eliminate change of the detection value of the photo detector in response to change of the copying magnification by mechanically displacing the photo detector in accordance with the changed copying magnification. The other method is to provide an electronic circuit for electrically performing arithmetic operations for compensating the detection value of the photo detector 5 with the copying magnification. Employment of either one of the two methods results in a considerably sophisticated arrangement.

Referring back to FIG. 1, when exposure of the photosensitive drum 13 has been completed by displacing the movable unit A and the actuator unit B in the scanning direction P, the movable unit A and the actuator unit B are moved in the direction Q opposite to the scanning direction P so as to be returned to their original positions. Thus, a light image corresponding to the image at the linear portion 3a of the original document 3 is formed on the photosensitive drum 13. It should be noted that the variable copying magnification type copying apparatus of FIG. 1 is a fixed original platform type in which the original platform 4 is secured to an apparatus housing of the copying apparatus.

Meanwhile, the first shielding plate 6 is provided at a position enabling transmission of only accurate information of the image of the original document 3 to the photo detector 5 so as to intercept unnecessary light rays incident upon the photo detector 5 from other portions of the original document 3 than the linear portion 3b, for example, light of specular reflection from the original platform 4, light incident upon the photo detector 5 directly or indirectly from the light source 1, or delayed or preceding light information other than information synchronous with the copying operation. An optical path of a light ray m reflected from the linear portion 3b to the photo detector 5 is different from the optical path of the light ray L led from the linear portion 3a to the photosensitive drum 13 and, needless to say, does not intercept information of the image at the linear portion 3a of the original document 3 at all.

Hereinbelow, the first shielding plate 6 will be described with reference to FIGS. 2 to 7. The opening 6a, having a predetermined shape, is formed in the first shielding plate 6 as described earlier. In this embodiment of the present invention, by employing a method (1) of changing the shape of the opening 6a or a method (2) of changing the position of the photodetector 5 relative to the first shielding plate 6, it becomes possible to measure quantity of light indicative of photographic density of the original document 3 in various modes.

The above described methods (1) and (2) will be described more specifically.

Method 1

Figure 2A:
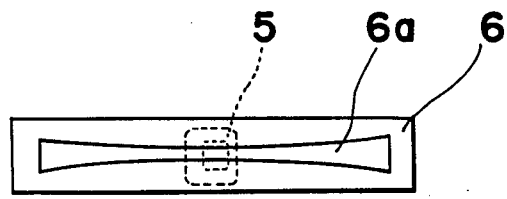
FIG. 2a is a top plan view of a shielding plate employed in the automatic exposure adjusting device of FIG. 1.
Figure 2B:
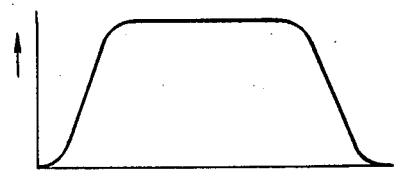
Figure 3A:
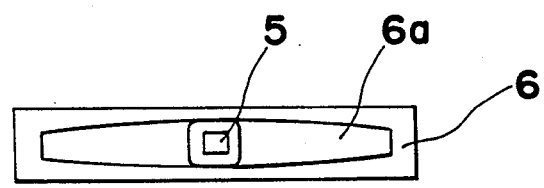
Figure 3B:
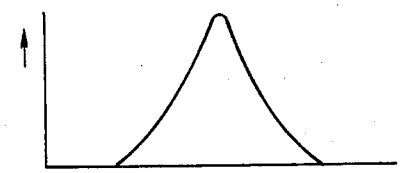
Figure 4A:
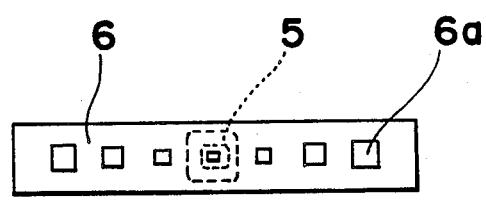
Figure 4B:
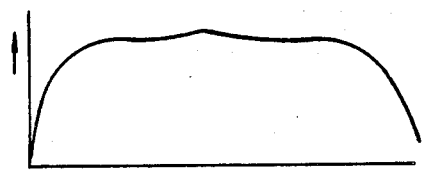

Arrangements employing method (1) are shown in FIGS. 2 to 4. Each of FIGS. 2a, 3a and 4a is a top plan view of the first shielding plate 6, while each of FIGS. 2b, 3b and 4b is a graph having its abscissa indicative of the longitudinal distance of the first shielding plate 6 and its ordinate indicative of relative quantity of light passed through the opening 6a of the first shielding plate 6. In FIG. 2a, the opening 6a has its maximum width at the opposite end portions of the first shielding plate 6 and its minimum width at the central portion of the first shielding plate 6. On the other hand, in FIG. 3a, the opening 6a has its minimum width at the opposite end portions of the first shielding plate 6 and its maximum width at the central portion of the first shielding plate 6. Meanwhile, in FIG. 4a, the opening 6a is composed of seven square bores arranged longitudinally sequentially. The bore disposed at the central portion of the first shielding plate 6 is made minimum in size and the bores are gradually made larger in size as the bores are further separated from the central bore towards the opposite end portions of the first shielding plate 6 such that uniform distribution of quantity of light passed through the opening 6a can be obtained. The arrangements of FIGS. 2, 3 and 4 correspond to methods of averaged, selective and partially selective light measuring, respectively. Therefore, by employing any one of the arrangements of FIGS. 2, 3 and 4, one of the methods of averaged light measuring, selective light measuring and partially selective light measuring can be selected arbitrarily.

Method (2)

Figure 5A:
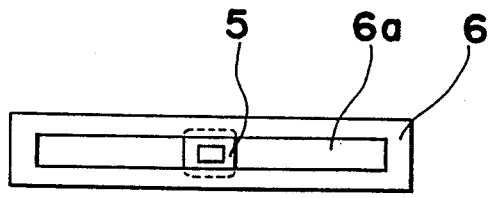
Figure 5B:
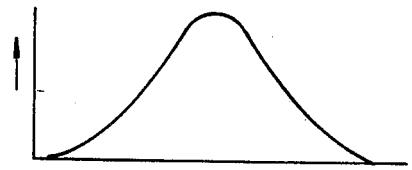
Figure 6A:
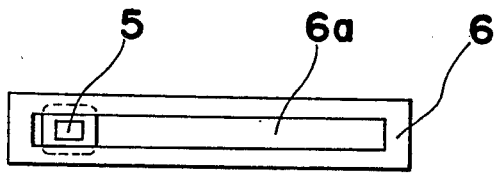
Figure 6B:
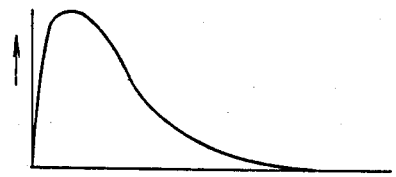
Figure 7A:
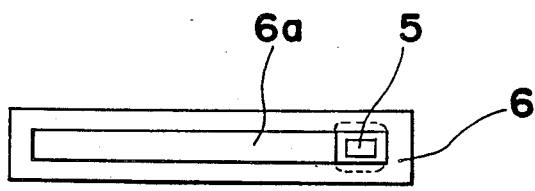
Figure 7B:

Arrangements employing method (2) are shown in FIGS. 5 to 7. In the same manner as in FIGS. 2 to 4, each of FIGS. 5a, 6a and 7a is a top plan view of the first shielding plate 6, while each of FIGS. 5b, 6b and 7b is a graph having its abscissa indicative of the longitudinal distance of the first shielding plate 6. In FIG. 5a, the photo detector 5 is disposed at the central portion of the first shielding plate 6. On the other hand, in FIG. 6a, the photo detector 5 is disposed at the left end portion of the first shielding plate 6, while in FIG. 7a, the photo detector 5 is disposed at the right end portion of the first shielding plate 6. By employing any one of the arrangements of FIGS. 5, 6 and 7, it is apparently possible to change the light measuring area of the photo detector 5. Meanwhile, although the opening 6a has a rectangular shape in the arrangements of FIGS. 5, 6 and 7, the opening 6a can be formed into any arbitrary shape in accordance with size of the original document 3. At this time, in the case of light measuring for a narrow range the longitudinal length of the opening 6a is made small, while in the case of light measuring for a wide range the longitudinal length of the opening 6a is made large. Meanwhile, the sidewise length (width) of the opening 6a is designed to restrict quantity of light for detecting photographic density of the original document 3. Thus, when the width of the opening 6a is too small, the quantity of light for detecting photographic density of the original document 3 becomes insufficient. Reversely, when the width of the opening 6a is too large, light rays unnecessary for detecting photographic density of the original document 3 proceed through the opening 6a to the photo detector 5. Accordingly, the width of the opening 6a should be determined properly on the basis of performances of the copying apparatus and positional relations among the linear portion 3b subjected to detection of photographic density of the original document 3 by the photo detector 5, the first shielding plate 6 and the photo detector 5. In this embodiment of the present invention, it was proved that the width of the opening 6a is most properly set at 1 to 3 mm.

Figure 8:
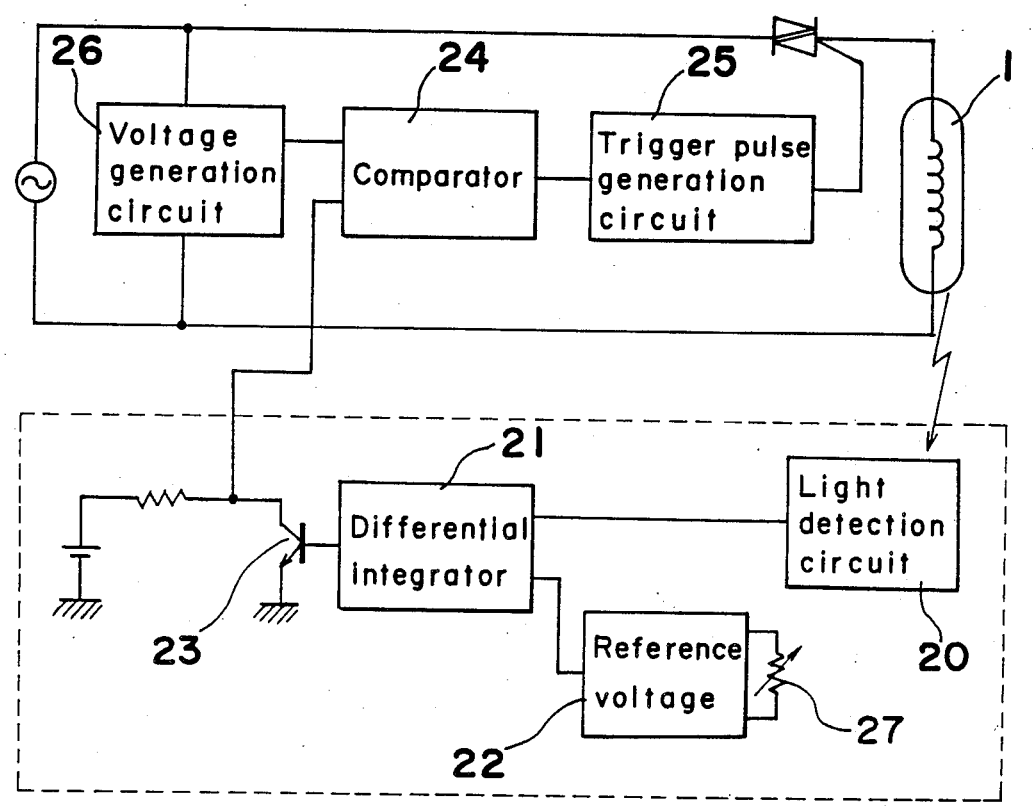
FIG. 8 is an electrical block diagram of a control circuit for the automatic exposure adjusting device of FIG. 1.
Figure 9:
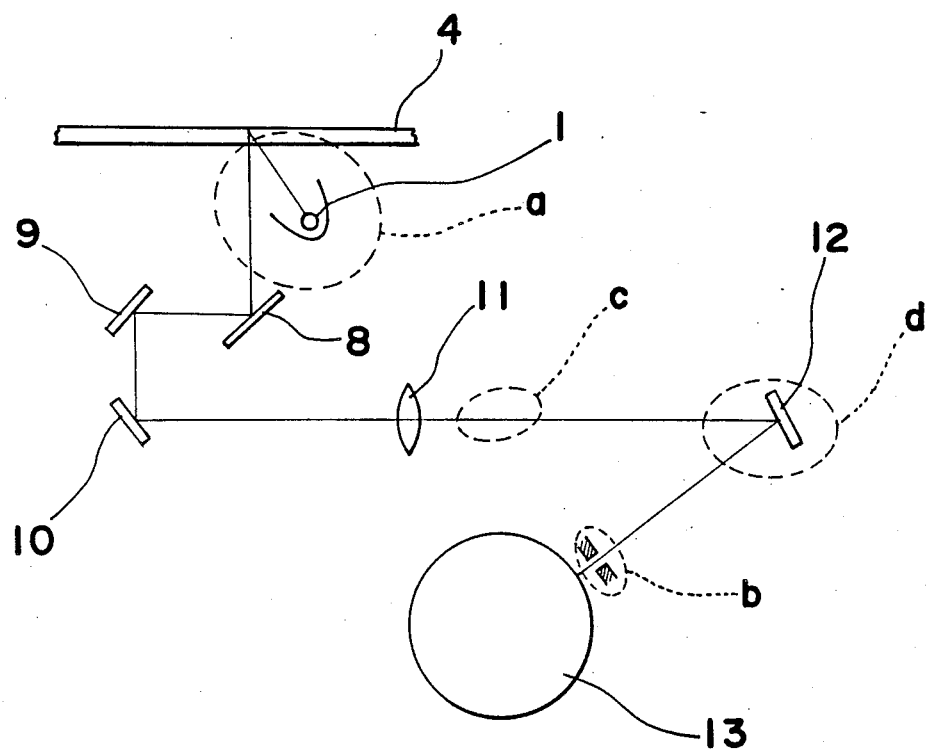
FIG. 9 is a schematic view explanatory of a position of a photo detector employed in the automatic exposure adjusting device of FIG. 1.

Referring to FIG. 8, there is shown a control circuit for the automatic exposure adjusting device K. The control circuit includes a light detection circuit 20, a differential integrator 21, a reference voltage setting unit 22 for setting a reference voltage, a transistor 23, a comparator 24, a trigger pulse generation circuit 25, a voltage generation circuit 26 and a variable resistor 27. Light irradiated by the light source 1 and reflected from the original document 3 is detected by the light detection circuit 20 and an output voltage of the light detection circuit 20 is applied to the differential integrator 21. The differential integrator 21 is also connected to the reference voltage setting unit 22 so as to integrate a potential difference between the output voltage of the light detection circuit 20 and the reference voltage of the reference voltage setting unit 22. Therefore, an output voltage of the differential integrator 21 varies in accordance with the potential difference between the output voltage of the light detection circuit 20 and the reference voltage of the reference voltage setting unit 22. The output signal of the differential integrator 21 is applied to the base of the transistor 23 so as to control the collector voltage of the transistor 23.

By the above described arrangement of the control circuit, the output voltage of the differential integrator 21 is held at a fixed value or increases. The former case where the output voltage of the differential integrator 21 is held at the fixed value takes place when there is no potential difference between the output voltage of the light detection circuit 20 and the reference voltage of the reference voltage setting unit 22. Thus, since the base voltage of the transistor 23 is constant, the collector voltage of the transistor 23, which is applied to the comparator 24, is constant, so that quantity of light of the light source 1 becomes constant. Meanwhile, the latter case where the output voltage of the differential integrator 21 increases takes place when the output voltage of the light detection circuit 20 rises in response to light reflected from the original document 3 such that a positive potential difference exists between the output voltage of the light detection circuit 20 and the reference voltage of the reference voltage setting unit 22. At this time, the base voltage of the transistor 23 increases and an internal resistance of the transistor 23 drops, so that the collector voltage of the transistor 23 decreases. The collector voltage of the transistor 23 is an input voltage of the comparator 24. Then, the trigger pulse generation circuit 25 is controlled by an output voltage of the comparator 24 and thus, the voltage (effective value) of the light source 1 drops. Accordingly, since the output voltage of the light detection circuit 20 decreases, the potential difference between the output voltage of the light detection circuit 20 and the reference voltage of the reference voltage setting unit 22 is reduced. By repeating the above described steps, the potential difference between the output voltage of the light detection circuit 20 and the reference voltage of the reference voltage setting unit 22 is stably held at zero. Furthermore, the latter case takes place also when a negative potential difference exists between the output voltage of the light detection circuit 20 and the reference voltage of the reference voltage setting unit 22 due to drop of the output voltage of the light detection circuit 20 below the reference voltage of the reference voltage setting unit 22. At this time, the base voltage of the transistor 23 decreases and the collector voltage of the transistor 23 increases. Consequently, since the input voltage of the light source 1 is increased, the output voltage of the light detection circuit 20 also increases. Subsequently, the potential difference between the output voltage of the light detection circuit 22 and the reference voltage of the reference voltage setting unit 22 is stably set at zero in the same manner as described above.

In the control circuit of FIG. 8, setting of the reference voltage is performed by adjusting the variable resistor 27. In the case of change in such external conditions as temperature, humidity, etc. of the copying apparatus and deterioration of the photosensitive drum 13, developer, etc., it becomes possible to obtain accurate copies of the original document 3 at all times by changing the resistance value of the variable resistor 27. To this end, it is preferable that the variable resistor 27 is provided at a location enabling easy adjustments thereof, for example at an operating panel disposed on a front face of the copying apparatus.

Meanwhile, although the above described embodiment of the present invention has been described in the case of utilization of light reflected from the original document 3, it is needless to say that the present invention is also applicable to an arrangement employing light transmitted through the original document 3.

The automatic exposure adjusting device K has the following advantages (1) to (4).

(1) Since the photo detector 5 and the first shielding plate 6 disposed between the original document 3 and the photo detector 5 are disposed at the location spaced away from the optical path for directing to the photosensitive drum 13 reflected light (or transmitted light) from the original document 3, light rays proceeding from other portions of the original document 3 than the linear portion 3b and unnecessary for detecting photographic density of the original document 3 can be eliminated. Accordingly, it is possible to detect photographic density of the original document 3 accurately and effect accurate control of exposure amount of the photosensitive drum 13 on the basis of the accurate detection value of photographic density of the original document 3.

(2) A wide range of photographic density of the original document 3 can be detected by a small number of or even a single photo detector 5. Furthermore, one of the methods of averaged light measuring, selective light measuring, partially selective light measuring, etc. can be arbitrarily employed by changing the shape of the opening 6a of the first shielding plate 6 variously.

(3) Since the variable resistor 27 for the reference voltage setting unit 22 is provided in the control circuit for the automatic exposure adjusting device K, it becomes possible to rapidly deal with changes of external conditions of the copying apparatus and deterioration of the photosensitive drum 13, developer, etc. by adjusting the variable resistor 27.

(4) It is possible to totally obviate an inconvenience associated with an arrangement in which a device (photo detector 5) for detecting photographic density of the original document 3 is provided in the optical path leading from the original document 3 to the photosensitive drum 13.

As is clear from the foregoing description, in accordance with the present invention, since the device for detecting photographic density of the original document is provided at the location spaced away from the optical path leading from the original document to the photosensitive member, automatic exposure adjustments of high quality can be performed, whereby clear and vivid copies can be obtained from any original document.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic exposure adjusting device for use in a variable copying magnification type copying apparatus enabling continuous change of its copying magnification, which controls quantity of light from a light source of said copying apparatus on a real time basis by detecting the photographic density of a scanned portion of a copy face of an original document by the use of a photo detector during the copying operation of said original document, wherein:
    said photo detector is provided below and adjacent to said light source; and
    a shielding plate is provided below and adjacent to said copy face of said original document and is formed with a slit such that said slit is brought into alignment with an optical path for subjecting a photosensitive member of said copying apparatus to exposure.

2. The automatic exposure adjusting device as claimed in claim 1, wherein said photo detector is provided at a location spaced away from said optical path.

3. The automatic exposure adjusting device as claimed in claim 1, further comprising:
    a shielding member which is provided between said original document and said photo detector said shielding member being formed with an opening for permitting the light of said light source reflected from said scanned portion to proceed therethrough to said photo detector.

4. The automatic exposure adjusting device as claimed in claim 2, further comprising:
    a shielding member which is provided between said original document and said photo detector, said shielding member being formed with an opening for permitting the light of said light source reflected from said scanned portion to proceed therethrough to said photo detector.

5. The automatic exposure adjusting device of claim 4, wherein the light source, reflector photo detector, shielding plate and shielding member from part of a movable unit which moves in the scanning direction to scan the original document.

6. The automatic exposure adjusting device of claim 5, wherein an actuator unit constituted by reflecting mirrors is moved in the scanning direction.

7. The automatic exposure adjusting device of claim 3, wherein the opening in the shielding member is about 1 to 3 mm.

* * * * *